United States Patent [19]
Marot

[11] 3,728,580
[45] Apr. 17, 1973

[54] CORE-BALANCE EARTH LEAKAGE PROTECTION

[75] Inventor: Maurice R. Marot, Transvaal, Republic of South Africa

[73] Assignee: Electrical Protection Company (Proprietary) Limited, Benoni, Transvaal, Republic of South Africa

[22] Filed: Apr. 6, 1971

[21] Appl. No.: 131,798

Related U.S. Application Data

[63] Continuation of Ser. No. 819,900, April 28, 1969, abandoned.

[52] U.S. Cl. ............................... 317/18 D, 317/27 R
[51] Int. Cl. ............................................... H02h 3/28
[58] Field of Search .......................... 317/18 D, 27 R; 321/45 C

[56] References Cited

UNITED STATES PATENTS

| | | | |
|---|---|---|---|
| 3,473,091 | 10/1969 | Morris et al. | 317/18 D |
| 3,355,654 | 11/1967 | Risberg | 321/45 C |
| 3,525,903 | 8/1970 | Morris et al. | 317/18 D |
| 3,555,360 | 1/1971 | Lee et al. | 317/18 D |

Primary Examiner—James D. Trammell
Attorney—Peter J. Gaylor

[57] ABSTRACT

The core balance earth leakage protection device is improved by providing in combination with it a suitable saturable core reactor whose winding is connected in series with one primary winding of the device, usually that connected in series with the neutral conductor of the circuit. The saturable core reactor is adapted to provide an impedance of substantial value for currents below and near the rated threshold sensitivity of the device but to be saturated at the usual load current values for which the device is adapted, and to therefore offer negligible impedance to the flow of load currents. The core balance earth leakage protection device is advantageously further provided in combination with a preload impedance connected between a line conductor at a point on the load side of one winding of the device and the neutral conductor at a point on the load side of another winding of the device, adapted to draw sufficient additional current through the one winding of the device to overcome the balancing current that would flow in the other winding due to an earth short circuit. The effective impedance of the tripping core of the device must be low in comparison to the impedance of the saturable core reactor for values of current in the order of the threshold sensitivity of the device.

8 Claims, 4 Drawing Figures

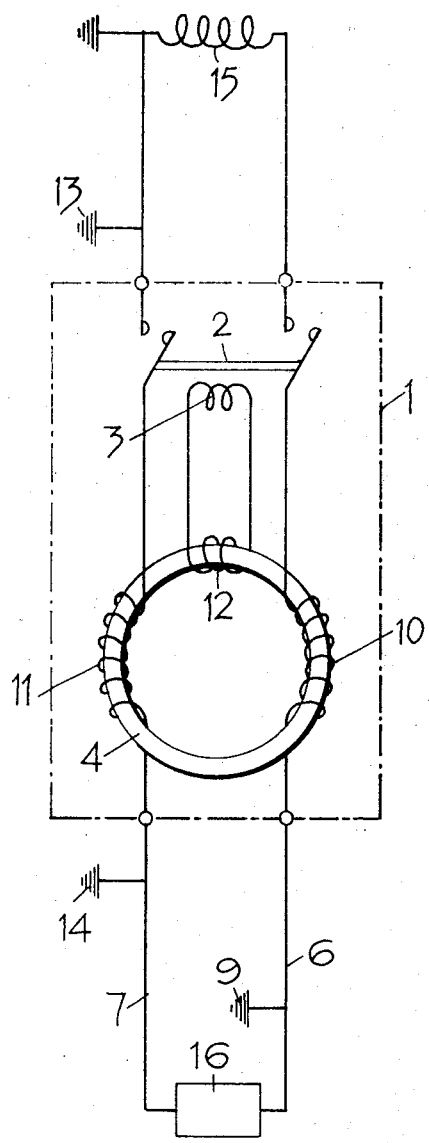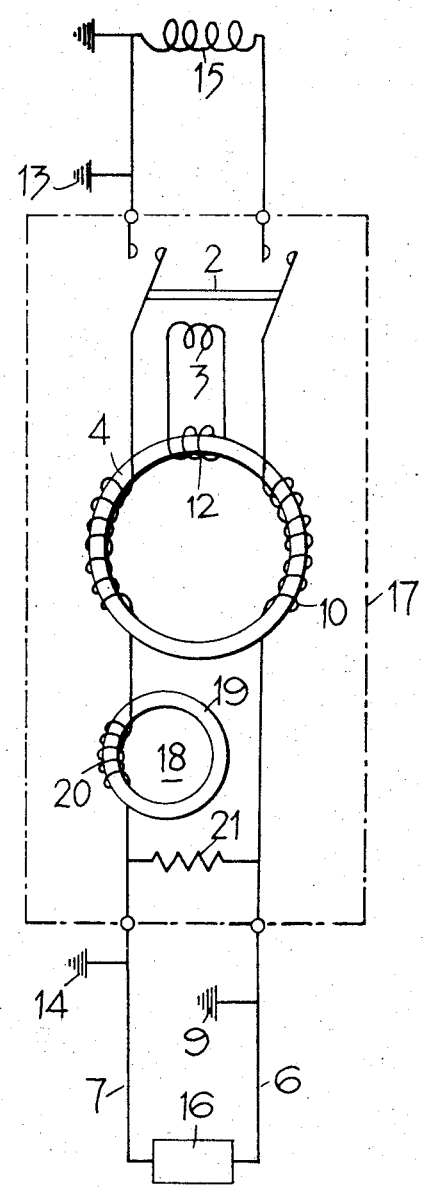

CORE-BALANCE EARTH LEAKAGE PROTECTION

BACKGROUND OF THE INVENTION

This invention relates to core-balance earth leakage protection and provides means of improving the effectiveness of reliability of known types of sensitive core-balance earth leakage protection devices and the present application is a continuation of application Ser. No. 819,900 filed Apr. 28, 1969, now abandoned.

To explain the presently known problem more fully it is as well to explain the function of the known high sensitivity core-balance earth leakage protection device, and its method of use.

Refer to FIG. 1 illustrating known core-balance earth leakage protection schematically.

Item 1 is a high sensitivity core-balance earth-leakage protection device comprising usually, an interrupting means 2 which will open when tripping coil 3 receives an electrical signal of sufficient magnitude, and a magnetic core 4 of (usually) high magnetic permeability, with two or more primary windings 10 and 11, series connected with the conductors 6 and 7 of a circuit to be protected, so that the vector sum of the currents flowing in the windings 10 and 11 will be zero as long as the flow of electric current is confined within the insulated conductors of the circuit being protected. The interrupting means 2 and magnetic core 4 could either be in one enclosure, forming one device, or alternatively, mounted separately but electrically interconnected, thus forming two devices having the same function as the former. FIG. 1 shows the device 1 installed in a circuit feeding a single phase load 16, with a single phase transformer 15, forming the power supply.

The principles of operations being discussed apply equally to polyphase circuits, adaptable in a manner well known to those skilled in the art.

The device is so designed that when there is no leakage of current to earth from either of the conductors 6 or 7, or from the load 16, (e.g. windings of a motor or transformer), then the ampere-turns in each of the windings 10 and 11 will balance one another, and there will be no magnetic flux induced in the core 4. Tripping coil 3 will therefore receive no signal, irrespective of the current being drawn by the load 16.

If, however, there is a leakage of electric current to earth at point 9, say, on conductor 6, then the additional ampere-turns resulting in winding 10 is not being balanced by the same number of ampere-turns in winding 11. An alternating magnetic flux will then be induced in coil 4 which will cause an electromotive force to be induced in secondary winding 12 which will in turn cause current to flow through tripping coil 3, thus causing interrupting means 2 to isolate the supply to the now faulty circuit.

The device described above is well known in this art, and usually operates satisfactorily.

There is, however, a set of circuit conditions which could be created fortuitously, or purposely, which will render the device less sensitive, or even inoperative to earth leakage currents, at, say, point 9. If there exists a connection to earth at point 13 on what is commonly known as the neutral conductor 7 of the circuit, and there exists in addition, a connection to earth at point 14 on the same conductor, then under this condition it is possible that the protection device 1 might not respond to leakage of current at point 9 on what is commonly known as the line conductor 6 of the circuit.

The reason for this maloperation is the following. The presence of earth connections of low impedance at both points 13 and 14 represents a short circuit across the winding 11. Now, when a leakage current occurs at point 9 the additional ampere-turns through winding 10 will cause balancing ampere-turns to flow through winding 11 and the earth short circuit, which by virtue of the low impedance of the earth connections will not induce appreciable magnetic flux in the core 4. There will therefore be no appreciable current generated in coil 3 and interrupting means 2 will not function.

SUMMARY OF THE INVENTION

The object of the invention is to effect an improvement whereby the core-balance earth leakage protection device is still responsive to earth faults even in the presence of earths on the neutral conductor at both the supply side and the load side of the device.

In accordance with this invention a core-balance earth leakage protection device is provided in combination with a suitable saturable core reactor whose winding is connected in series with one primary winding of the device usually that connected in series with the neutral conductor of the circuit.

A "suitable" saturable core reactor will be one which will provide an impedance of substantial value for currents below and near the rated threshold sensitivity of the device but which will be saturated at the usual load current values for which the device is adapted, and therefore offer negligible impedance to the flow of load currents. In practice, of course, it will be desirable to maintain the impedance to load currents as low as possible while still achieving sufficient impedance to currents near the rated threshold sensitivity. Thus preferably the reactor will be adapted to substantially saturate at currents near the rated threshold sensitivity of the device, desirably slightly above that value. A suitable impedance at currents near saturation will be substantially larger than the effective impedance of the tripping coil. It is desirable that the saturation current will at least not be more than low multiples of the rated threshold sensitivity current of the device.

BRIEF DESCRIPTION OF THE DRAWINGS

In the drawings:

FIG. 1 is a schematic illustration of known core balance earth leakage protection comprising a known device in a typical simplified power circuit, FIG. 2 is a schematic illustration of a preferred embodiment of this invention incorporated in a typical simplified power circuit.

Figure 3:
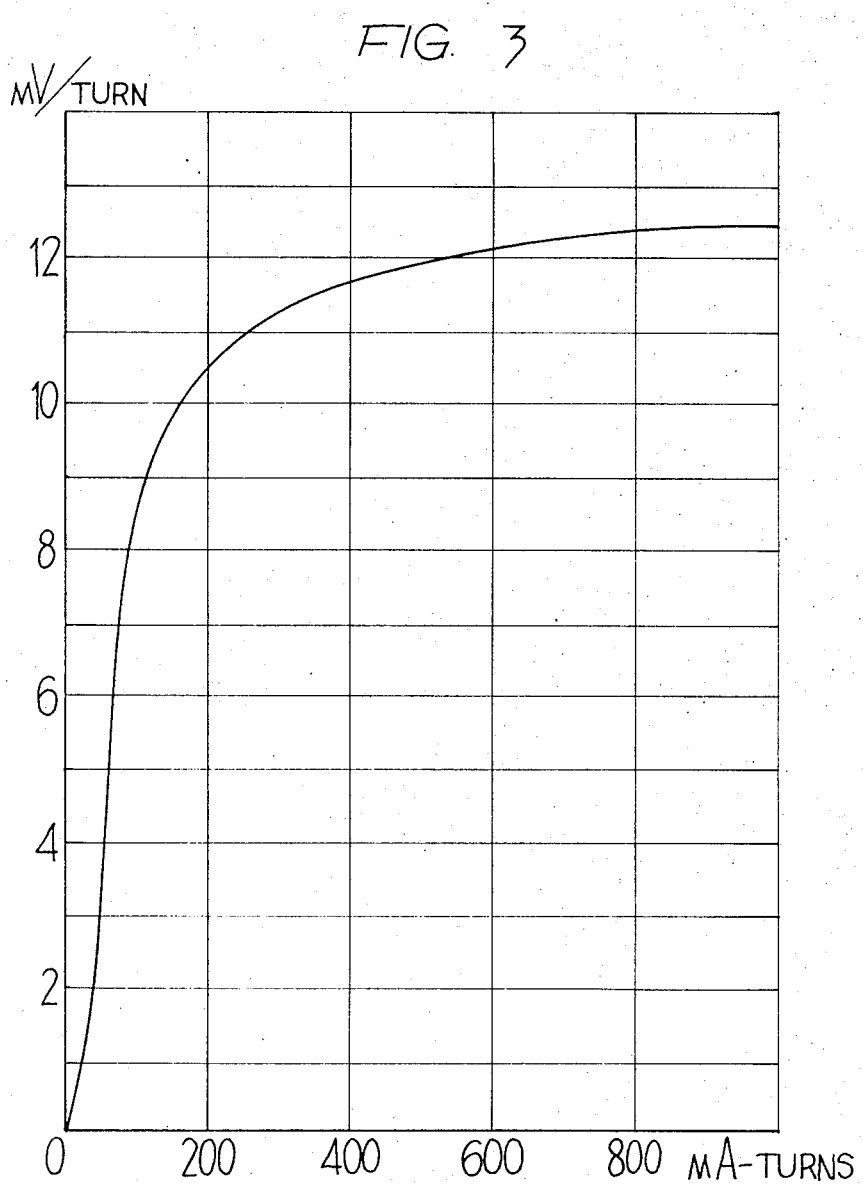
FIG. 3 is a graph from which the operation of the saturable core reactor can be deducted.

DESCRIPTION OF THE PREFERRED EMBODIMENTS.

In FIG. 2 supply, e.g. a transformer of which only the secondary winding 15 is shown, provides power to load 16 via one or more line and neutral conductors 6 and 7 respectively. In order to protect the load and the circuit against earth leakage faults, earth leakage protective relay 17 is connected in circuit with the main supply conductors 6 and 7.

An earth leakage protective device in a combination in accordance with a preferred embodiment of the invention comprises a circuit interrupting means 2, fitted with a tripping coil 3 responsive ultimately to a predetermined induced alternating magnetic flux in a magnetic core 4, two or more windings 10 and 11 linking with the magnetic core and connected in series with the line and neutral conductions 6 and 7 respectively, with a saturable core reactor 18 comprising a magnetic core 19 and a winding 20 series connected between the neutral conductor 7 and with one winding 11.

While the tripping coil 3 is here shown as directly connected to secondary winding 12 for simplicity, as is well known in the art, intermediate relays may be employed; the tripping coil will still ultimately be responsive to the flux.

The design of the saturable reactor will be such that when a power frequency alternating current preferably equivalent, approximately, to the threshold of earth leakage sensitivity of the relay is passed through winding 20, the induced alternating magnetic flux in the core 19 would be of a value approaching the magnetic saturation value of the said core. The reactor will offer, therefore, negligible impedance to the flow of load currents which are much higher than the threshold of sensitivity of the relay.

By way of example, FIG. 3 illustrates the Induction Curve of a typical core 19 with induction along the ordinate expressed in millivolts per turn, and magnetomotive force along the absicissa expressed in milliampere-turns. The winding would comprise seven turns for a relay having an earth leakage sensitivity of 20 milliamperes. At the threshold of sensitivity of the relay, the magnetomotive force would be $7 \times 20 = 140$ mA turns. At this force the induction (or reactance voltage) in the core would be approximately 10 millivolts per turn (see FIG. 3), representing a total volt drop across the winding of 70 millivolts.

Impedance of Reactor $= (0.07/0.02) = 3.5$ ohms.

For a load current of, say, 60 amperes, which would also flow through winding 20, the impedance would be considerably reduced.

Impedance at 60 ampere $=$ (Saturation Voltage/60)
$= (0.013 \times 7/60)$
$= (0.091/60)$
$= 0.0015$ ohms.

The advantage of incorporating such a reactor will now become apparent:

1. It offers negligible additional impedance in the supply circuit, thus allowing heavy loads to be drawn through the device with negligible loss of power.

2. It improves the reliability of the device as will be seen from the following explanations:

Case A: No load being drawn by 16 : low impedance earth faults at 13 and 14.

The device will respond to an earth leakage current at point 9 of a value approximating the rated threshold of sensitivity of the device since winding 11 has in series with it an impedance of substantial value which will impede the flow of balancing ampere-turns in this winding. Almost all the ampere-turns flowing through winding 10 will be utilised in magnetising the core 4 as well as providing power to trip element 3. It is obvious to say that the effective impedance of the tripping coil 3 must be low in comparison to the impedance of reactor 18 for values of leakage current in the order of the threshold of sensitivity of the device. This is easily obtainable with the reactor impedance of 3.5 ohms at currents near saturation.

Case B: Load current being drawn by 16 : earth connection at 13 only.

Under these conditions the relay will still respond to an earth leak current at point 9, at a value equivalent to the rated threshold sensitivity of the relay. However, the moment an earth connection of low resistance is applied at point 14 the relay will immediately respond and isolate the supply without there being a fault at point 9. This is an advantage, and is due to the fact that a large proportion of the load current in the neutral conductor will effectively by-pass the winding 11, and sufficient of the load ampere-turns in winding 10 is available to trip the device 2.

The above cited cases are mere examples of the behaviour of the new device in two sets of circumstances, but it will be obvious to those skilled in the art to predict the overall improved performance of the new device. The invention is furthermore not at all limited to the values of these examples, and it should not be implied that it could only be operated within the order of magnitude of these values. The principle may be explained as this, namely, that the saturable-core reactor 18 will always provide an appreciable impedance in circuit with one primary winding (winding 11 in this example) of the core 4 and, if this impedance is large compared to the effective impedance of the tripping coil 3, will allow sufficient magnetic flux to be induced in the core 4 by another winding to operate a tripping coil 3 should an accidental earth short circuit occur.

It is not necessary that the saturable reactor 18 is included in the same enclosure as the device as it can with advantage be mounted separately, for example, as part of the "neutral bar" in the distribution panel.

Figure 4:
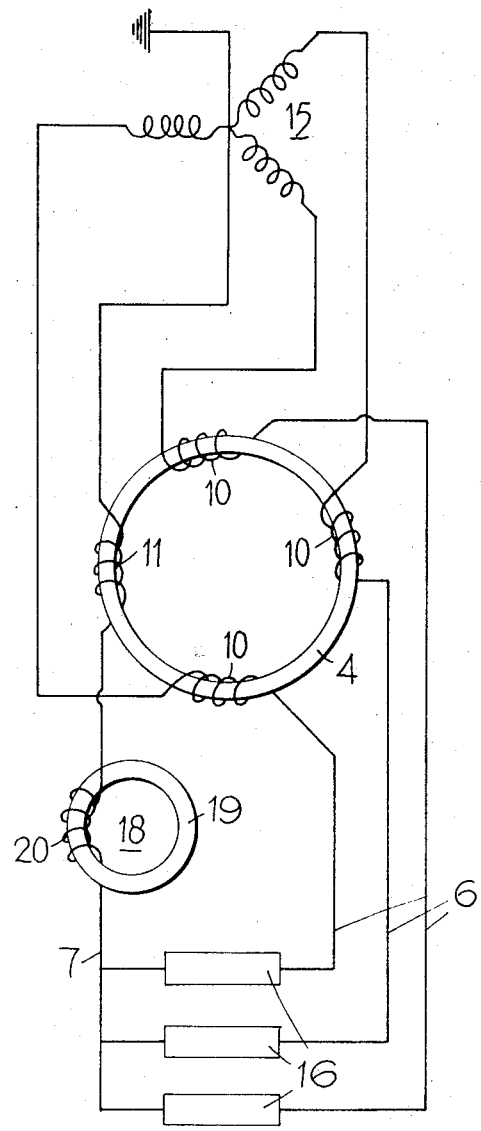
FIG. 4 is a schematic illustration of a further preferred embodiment of this invention applied to a three phase four-wire power circuit.

The saturable reactor may be used in a similar way for a three phase four wire power distribution. FIG. 4 illustrates how the relay primary windings would be arranged in relation to the saturable reactor, although the interrupting means and tripping coil are not shown for simplicity sake in this view.

As mentioned earlier in the specification, it is also important that the effective impedance of trip coil 3 be as low as possible when compared with the unsaturated impedance of the reactor 18. A ratio 1 : 10 is easily obtainable, but nevertheless, it will be found that the sensitivity of the relay to an earth leak current at point 9, with points 13 and 14 connected to earth will be slightly reduced. In one example it was found that the sensitivity of response was 38 mA instead of 20 mA in the case of no earth at point 14.

It is a further embodiment of the invention that a preloading impedance 21 be connected between the line conductor 6 at a point on the load side of the winding 10, and a point on the neutral conductor 7 on the load side of the reactor. The value of this impedance would be such as to draw sufficient additional ampere-turns through winding 10 to overcome the balancing ampere-turns that would flow in winding 11 due to points 13 and 14 being connected to earth.

In an example, it was found that a pre-load resistance of 10,000 ohms, (4 watt), was sufficient to show no difference in sensitivity of the relay whether the points 13 and 14 were simultaneously earthed or not. The supply voltage in this case was 200 volts, and no current was being drawn by load 16.

An alternative method included in the scope of this invention, is to select the pre-load impedance so that it will draw sufficient current to cause the relay to trip the moment point 14 is, in addition to point 13, connected to earth. In this case the impedance would be approximately 5000 ohms for a 200 volt supply.

It must be understood that a pre-load would otherwise be excessively large and prohibitive in price were it not for the effectiveness of the saturable reactor. The form that the pre-load could take could be a resistor, an inductor, or even an item of equipment such as an ON-OFF indicating lamp.

The scope of the invention is not limited to the pre-load being part of the device enclosure as it would function equally well if it were mounted separately with the same electrical connections.

Although the drawings illustrate the secondary winding 12 simply directly connected to the tripping coil 3, it should be understood that an indirect connection incorporating a relay or other known means is included within the scope of this invention.

I claim:

1. An earth leakage protective system for protecting a load circuit from dangerous earth fault currents, comprising a source of alternating current, a load device adapted to be energized by said source and a core balance protection device interposed between said source and said load device, said core balance protection device comprising a differential transformer having a closed core which is linked by two primary windings and a secondary winding, each of said primary windings being connected in series with a line of the circuit connecting said load device to said source, a relay switch including a coil energized from said secondary winding to open the line circuit and de-energize the load device when a resultant magnetomotive force is produced in said closed core by an unbalance of the currents flowing in said primary windings as a result of a diversion of load current away from a line and its corresponding primary winding as a result of an earth leakage fault, and means for protecting said differential transformer against mal-operation in the presence of earth faults on both the source side and the load side of one of said primary windings causing a low impedance short circuit of that winding which comprises a saturable core reactor connected in series with that one of said primary windings and said load device, said saturable reactor being designed to saturate at a value of load current less than the rated current of the load device, whereby when rated current is supplied to said load device through said reactor, the impedance of said reactor is a minimum and said reactor offers minimal impedance to the flow of load current, and whereby when an earth leakage fault diverts the load current away from and effects de-saturation of said reactor and away from said series connected primary winding the impedance of said reactor is a maximum so that it is possible for a sufficient resultant magnetomotive force, to be generated in the differential transformer as a result of magnetomotive imbalance caused by an earth fault to induce a substantial current in said secondary winding to actuate said relay switch to open said line circuit and de-energize said load.

2. A core-balance earth leakage protection device as claimed in claim 1, in which said one primary winding is that connected in series with the neutral conductor of the circuit to be protected.

3. A core-balance earth leakage protection system as claimed in claim 1, in which the saturation current of said reactor is not more than a few multiples of the rated threshold sensitivity current of said coil of said relay switch.

4. A core-balance earth leakage protection system as claimed in claim 3, in which said reactor is adapted to substantially saturate at currents near the rated threshold sensitivity of said coil of said relay switch.

5. A core-balance earth leakage protection system as claimed in claim 1, in which the impedance of said reactor at currents near saturation will be substantially larger than the effective impedance of said coil of said relay switch.

6. A core-balance earth leakage protection system as claimed in claim 1, and which further includes a pre-loading impedance connected between a line conductor at a point on the load side of a primary winding of said transformer, and a point on a neutral conductor on the load side of said reactor.

7. A core-balance earth leakage protection system as claimed in claim 6, in which said pre-loading impedance is adapted to draw sufficient additional ampere-turns from a primary winding of said transformer to which said reactor is not connected to overcome the balancing ampere-turns that would be induced in said winding to which said reactor is connected, due to an earth short circuit.

8. A core-balance earth leakage protection system as claimed in claim 7, in which said pre-loading impedance is resistive.

* * * * *